United States Patent
Ewert et al.

(10) Patent No.: US 9,369,942 B2
(45) Date of Patent: Jun. 14, 2016

(54) CALL CONTROL ENTITY FOR A COMMUNICATION NETWORK

(75) Inventors: Joerg Christian Ewert, Aachen (DE); Andreas Witzel, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 104 days.

(21) Appl. No.: 13/522,432

(22) PCT Filed: Jan. 21, 2010

(86) PCT No.: PCT/EP2010/050699
§ 371 (c)(1),
(2), (4) Date: Aug. 27, 2012

(87) PCT Pub. No.: WO2011/088897
PCT Pub. Date: Jul. 28, 2011

(65) Prior Publication Data
US 2013/0100883 A1    Apr. 25, 2013

(51) Int. Cl.
*H04W 40/24*    (2009.01)
*H04M 7/12*    (2006.01)
*H04L 29/06*    (2006.01)

(52) U.S. Cl.
CPC ............... *H04W 40/24* (2013.01); *H04L 29/06* (2013.01); *H04L 65/104* (2013.01); *H04L 65/1016* (2013.01); *H04L 65/1046* (2013.01); *H04M 7/125* (2013.01)

(58) Field of Classification Search
CPC ..... H04W 80/04; H04W 84/12; H04W 88/06; H04W 88/08; H04W 84/18; H04L 65/00; H04L 45/00; H04L 45/02; H04L 45/04
USPC .......................... 370/328, 310, 351, 355, 357
See application file for complete search history.

(56) References Cited

U.S. PATENT DOCUMENTS

2008/0247385 A1* 10/2008 Witzel .................. H04L 65/104
370/352
2009/0124248 A1* 5/2009 Ohnishi ................ H04W 60/00
455/422.1

(Continued)

FOREIGN PATENT DOCUMENTS

EP    2107819 A1    10/2009
WO    03017704 A1    2/2003

(Continued)

OTHER PUBLICATIONS

3rd Generation Partnership Project, "3rd Generation Partnership Project; Technical Specification Group Services and System Aspects; Intra-domain connection of Radio Access Network (RAN) nodes to multiple Core Network (CN) nodes (Release 9)", Technical Specification, 3GPP TS 23.236 V9.0.0, Dec. 1, 2009, pp. 1-39, 3GPPP, France.

(Continued)

*Primary Examiner* — Andrew Lai
*Assistant Examiner* — Zhiren Qin
(74) *Attorney, Agent, or Firm* — Coats & Bennett, PLLC (57) ABSTRACT

A communication network is described, comprising: —an access network, —a switching control network comprising call control entities arranged for association with subscribers, where said access network is arranged for routing signalling of a given subscriber to a call control entity associated with said given subscriber, and—an Internet Protocol based network for providing a set of services centred in said Internet Protocol based network to one or more of said subscribers, wherein said switching control network comprises a group of first call control entities and a group of second call control entities, said first call control entities are arranged for providing call control services to subscribers having circuit switched subscriptions, and said second call control entities are arranged for providing a gateway to connect to said Internet Protocol based network for subscribers having subscriptions to said set of services centred in said Internet Protocol based network, and each first call control entity has a subscriber association redirector for redirecting an association of a subscriber associated with said each first call control entity and having a subscription to said services centred in said Internet Protocol based network to said group of second call control entities.

22 Claims, 8 Drawing Sheets

(56) References Cited

U.S. PATENT DOCUMENTS

2010/0046501 A1* 2/2010 Witzel .................. H04W 8/06
370/352
2012/0264466 A1* 10/2012 Vainola ................ H04W 48/18
455/500

FOREIGN PATENT DOCUMENTS

| WO | 03019958 A1 | 3/2003 |
| WO | 2007045264 A1 | 4/2007 |
| WO | 2008055559 A1 | 5/2008 |

OTHER PUBLICATIONS

3rd Generation Partnership Project, "3rd Generation Partnership Project; Technical Specification Group Services and System Aspects; Network Sharing; Architecture and functional description (Release 9)", Technical Specification, 3GPP TS 23.251 V9.0.0, Sep. 1, 2009, pp. 1-19, 3GPP, France.

3rd Generation Partnership Project, "3rd Generation Partnership Project; Technical Specification Group Services and System Aspects; IP Multimedia Subsystem (IMS) centralized services; Stage 2 (Release 8)", Technical Specification, 3GPP TS 23.292 V8.5.0, Sep. 1, 2009, pp. 1-72, 3GPP, France.

* cited by examiner

CALL CONTROL ENTITY FOR A COMMUNICATION NETWORK

TECHNICAL FIELD

The present application relates to a communication network comprising a novel type of call control entity, to such a call control entity, to a method of controlling such a call control entity, and to a method of using such a call control entity for migrating subscriptions in a communication network.

BACKGROUND

When mobile telephone systems were first developed, circuit switched (CS) techniques were used. An example of a CS mobile telephone standard is GSM. In parallel, computer communications developed on the basis of a variety of protocols and most notably the Internet Protocol (IP), which is a packet based form of communication. A convergence of computer communication and mobile telephony has led to the introduction of the so-called IP Multimedia Subsystem (IMS) in mobile communication systems, which is an IP based network for providing certain IP based services to mobile subscribers.

More recently, the concept of IMS Centralized Services (ICS) has been proposed, see e.g. 3GPP TS 23.292 V.9.4.0 of December 2009. With ICS, user services are provided by the IMS. ICS subscribers may access the IMS in a number of ways, i.e. by means of different access paths, e.g. via a packet switched (PS) access (such as GPRS or UMTS), but also may connect via a CS connection. Thus, a user equipment (UE) may register or attach to IMS in a CS domain. The CS domain will comprise a Mobile Switching Center (MSC) or an MSC server. The MSC or MSC server receives subscriber data from a Home Subscriber Server (HSS) or Home Location Register (HLR) after a UE and MSC server perform a location update procedure. The subscriber data may include an optional flag. If the MSC server is enhanced for ICS it analyzes the flag value and attempts IMS registration if the flag indicates an ICS subscription, and otherwise does not attempt registration. If the MSC server is not enhanced for ICS it ignores the flag and performs regular or normal CS operation, i.e. it provides CS services as defined or standardized for CS (e.g. GSM) subscribers.

An MSC server enhanced for ICS needs to be equipped to act as a gateway to the IMS, e.g. has to provide conversion between the signalling protocols for call control on the CS side and the IMS side.

Migration of the CS subscriber base to IMS is an important issue for mobile operators. How to migrate millions of CS users to IMS in a cost efficient, practical and secure way is a concern in this connection. Some envisionable concepts are the use of Single Radio Voice Call Continuity (SR-VCC) and CS Fallback (CSFB), but application in multi-vendor networks (i.e. networks in which different network components are provided by different vendors) can be difficult. Multi-vendor networks are, however, the rule real mobile networks. A further difficulty is that there are cases where a CS vendor may not be willing to support the above mentioned migration features, or is not able to implement them in a timeframe as required by the migration plans of the operator.

Currently there is no practical solution of how to support IMS migration in a mixed vendor network where the supported services do not match. Specifically, there are cases where one vendor supports a proprietary set of legacy services, which cannot be migrated to IMS service domain, and at the same time this vendor does not support the above mentioned IMS migration features.

In a completely different context than IP based systems and subscription migration to such networks, it is known to provide pooling of MSCs, i.e. a concept where one access network may be shared by a plurality of core networks (CN), such that an access network node is not fixedly associated with a CN node, and thus a mechanism is provided for letting an access network select among CN nodes. EP 1 280 365 B1 describes such a system, including a mechanism for redirecting subscribers from one CN node to another.

SUMMARY

An object of an embodiment of the present application is to provide a generally applicable and at the same time simple mechanism for enabling migration of CS subscriptions to subscriptions to a set of services centred in an Internet Protocol based network, e.g. ICS.

According to an embodiment of the invention, a communication network is considered that comprises an access network and a switching control network comprising call control entities arranged for association with subscribers, where the access network is arranged for routing signalling of a given subscriber to a call control entity associated with the given subscriber. For example, the association is an attachment of the subscriber to a particular call control entity. Furthermore an Internet Protocol based network for providing a set of services centred in the Internet Protocol based network to one or more of the subscribers is provided. The said switching control network is arranged to comprise a group of first call control entities and a group of second call control entities. The first call control entities are arranged for providing call control services to subscribers having circuit switched subscriptions, and the second call control entities are arranged for providing a gateway to connect to the Internet Protocol based network for subscribers having subscriptions to the set of services centred in said Internet Protocol based network. Each of the first call control entities has a subscriber association redirector for redirecting an association of a subscriber associated with that first call control entity and having a subscription to the services centred in said Internet Protocol based network to said group of second call control entities.

Thus, the embodiment proposes on the one hand to employ a feature of grouping call control entities, and on the other hand to provide those of one group with the capacity to gateway to the Internet Protocol based network, and those of the other group with a mechanism for redirecting subscribers to the group with gateway functionality. Thus, it is not necessary to enhance all call control entities for providing full support for services centered in the Internet Protocol based network, which saves considerable costs and makes deployment of and migration to such subscriptions to the services centered in the Internet Protocol based network far simpler.

Further embodiments include a call control entity as described in claim 9 and a control method as described in claim 16.

Furthermore, the concepts can be applied to a method of migrating subscribers in a communication network as described above, comprising:
grouping the switching control network into a group of first call control entities and a group of second call control entities, the first call control entities are arranged for providing call control services to subscribers having circuit switched subscriptions, and the second call control entities are arranged for providing a gateway to connect to said Internet Protocol based network for subscribers having subscriptions to services of said Internet Protocol based network, providing in each first call control entity a subscriber association redirector for redirecting an association of a subscriber associated with each first call control entity and having a subscription to the set of services centred in said Internet Protocol based network to the group of second call control entities, and step by step or gradually changing predetermined groups of said circuit switched subscriptions to subscriptions to the set of services centred in the Internet Protocol based network.

Advantageous embodiments are described in the dependent claims.

BRIEF DESCRIPTION OF THE DRAWINGS

Embodiments of the present invention will now be described with reference to detailed embodiments, which include drawings explaining particular features and aspects, where.

DETAILED DESCRIPTION

Figure 1:
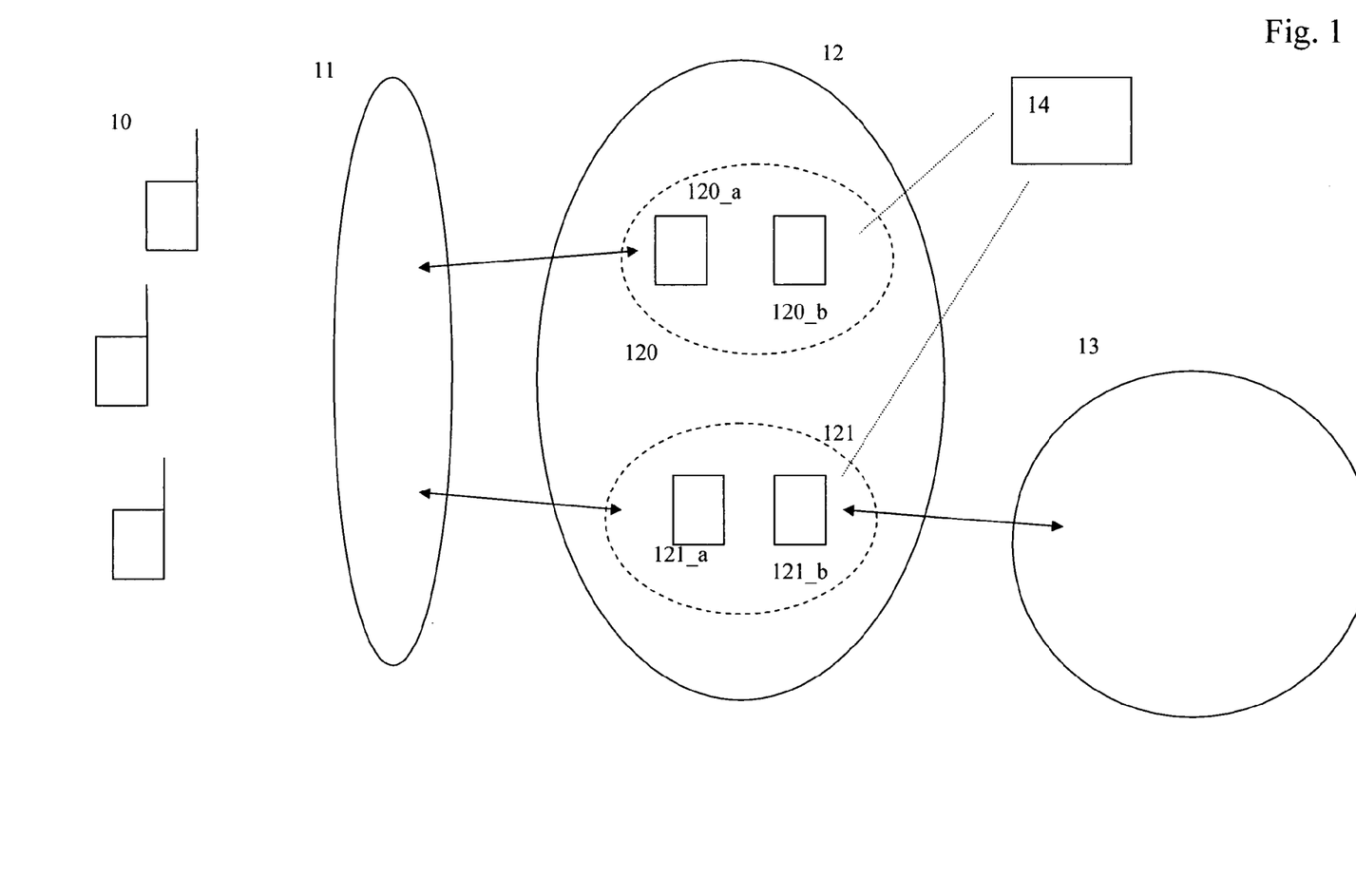
FIG. 1 shows a schematic representation of a communication system according to an embodiment of the present invention.

FIG. 1 shows a schematic representation of an embodiment of the invention. The shown communication network comprises an access network 11, e.g. a radio access network designed to allow mobile terminals 10 access to the communication network. The communication network furthermore comprises a switching control network 12 comprising call control entities 120_a, 120_b, 121_a, 121_b (e.g. MSCs or MSC servers) arranged for association with subscribers using the terminals 10, where the access network 11 is arranged for routing signalling of a given subscriber to a call control entity associated with the given subscriber. The association between subscriber or terminal and call control entity can be accomplished in suitable and desirable way, e.g. by providing appropriate identifiers for the call control entities, e.g. Network Resource Identifiers (NRIs), and assigning the NRIs to the subscribers or terminals.

The term "entity" refers to an element that provides the indicated functionality, and can be a physical unit, such as a network node, but can equally be constituted by a plurality of physical units acting together.

The communication network furthermore comprises an Internet Protocol based network 13 for providing a set of services centred in the Internet Protocol based network 13 to one or more of the subscribers. Network 13 can e.g. be an IMS and the set of services may be ICS.

In accordance with the present embodiment, the switching control network 12, which may be part of a core network (CN), is configured to comprise a group 120 of first call control entities 120_a, 120_b and a group 121 of second call control entities 121_a, 121_b. For example, the groups may be pools as described in 3GPP TS 23.236 V9.0.0 of December 2009. The first call control entities 120_a, 120_b are arranged for providing call control services to subscribers having circuit switched subscriptions. For example, they may be MSCs or MSC servers arranged to provide regular CS services, e.g. call waiting, call forwarding, etc. The second call control entities 121_a, 121_b are arranged for providing a gateway to connect to the Internet Protocol based network 13 for subscribers having subscriptions to the set of services centred in said Internet Protocol based network 13. The set of services may be similar or overlapping to the CS services, e.g. also include call waiting and forwarding, but may also include other, new services and functions. For example, the set of services may be Multimedia Telephone (MMTel) Services. Furthermore, it is noted that the group of second call control entities 121_a, 121_b may comprise MSCs or MSC servers enhanced to support IMS but also retaining the capability of providing CS services, but also may comprise dedicated gateway entities that do not provide CS services.

Also, FIG. 1 is naturally only an illustrative example, and each group or pool 120, 121 may have more or fewer entities in it, i.e. a group may contain one or more call control entities.

In accordance with the embodiment, each first call control entity 120_a, 120_b has a subscriber association redirector for redirecting an association of a subscriber associated with each first call control entity 120_a, 120_b and having a subscription to the services centred in said Internet Protocol based network 13 to the group 121 of second call control entities 121_a, 121_b.

The determination of what kind of subscription is present can e.g. be done with the help of an appropriate data base, such as a HSS or HLR 14, which may be queried by a call control entity and/or which may set corresponding parameters in the call control entities. For example, the subscriber association redirector may be arranged for detecting subscriptions to the set of services centred in said Internet Protocol based network 13 on the basis of a subscription marker set by a subscription register entity like HLR 14. According to a preferred embodiment, the marker is the ICS flag described e.g. in TS 23.292 V.9.4.0 in section 7.2.1.1. Thus, an embodiment of the present invention proposes to use the an appropriate marker (like e.g. the ICS flag) not just as an information element that leads to registration to network 13 (e.g. IMS registration) in fully enhanced MSC servers, but to the triggering of a redirection in MSC servers that are only slightly modified with respect to normal MSC servers. The slight modification can e.g. be implemented by a simple patch, thus avoiding the costly, complicated and time consuming full enhancement of all MSC servers at once and at the same time.

The redirecting to the second group 121 can be done in any suitable or desirable way. For example the association can be redirected to a member of the group, e.g. by using an individual member identifier, or the association can just generally be redirected to the group, e.g. by using a general group identifier. Both examples lead to a redirecting to the group.

For example, the subscriber association redirector may be arranged for redirecting the association by assigning a new Temporary Mobile Subscriber Identity. Then the redirector may be arranged for redirecting the association by one or both of:

setting a network resource identifier (e.g. an NRI) associated with one of the second call control entities 121_a, 121_b in the Temporary Mobile Subscriber Identity, and setting a group identity resource identifier (e.g. a Null-NRI) associated with the group 121 of second call control entities in the Temporary Mobile Subscriber Identity.

The subscriber association redirector may equally be arranged for redirecting the association of the subscriber having a subscription to said services centred in said Internet Protocol based network by sending a reroute command to the access network, e.g. a Multi-Operator Core Network (MOON) Reroute Command as specified e.g. by TS 23.251 V. 9.1.0 of December 2009.

Thus, in the present invention the concept of grouping (e.g. pooling of CN nodes) of call control entities is combined with the concept of subscriber or terminal redirection in the context of CS call control and service provision and service provision by an IP based network (e.g. IMS), in order to provide a simple but very effective mechanism for allowing migration of users from CS service subscriptions to subscriptions for services of the IP based network.

The method of migrating subscribers in a communication network comprises grouping the switching control network into a group of first call control entities and a group of second call control entities, the first call control entities are arranged for providing call control services to subscribers having circuit switched subscriptions, and the second call control entities are arranged for providing a gateway to connect to the Internet Protocol based network for subscribers having subscriptions to services of the Internet Protocol based network, providing in each first call control entity a subscriber association redirector for redirecting an association of a subscriber associated with each first call control entity and having a subscription to the set of services centred in the Internet Protocol based network to the group of second call control entities, and step by step or gradually changing predetermined groups of the circuit switched subscriptions to subscriptions to the set of services centred in the Internet Protocol based network. The step by step changing of predetermined groups means that an operator can provide a migration plan of gradually changing the subscriptions of more and more subscribers, but does not need to initially fully upgrade the CS network in such a way that all call control entities are fully enhanced to support IMS. It is sufficient to only have some call control entities that provide the gateway functionality to the IMS, which are grouped in the second group 121, and to provide the simple redirection mechanism in the other call control entities, which are grouped in the first group 120. This redirection mechanism can e.g. be implemented by a simple patch, i.e. can be rapidly implemented at low cost and with no impact on the ongoing operation.

Figure 2:
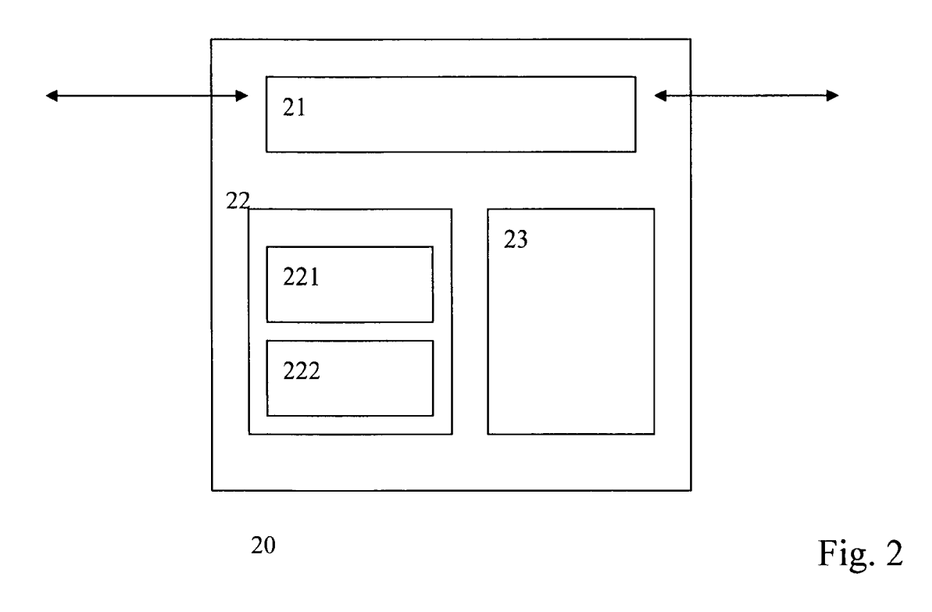
FIG. 2 shows a schematic representation of a call control entity according to an embodiment of the present invention.

FIG. 2 shows a schematic representation of a call control entity arranged to provide the above described functionality. The call control entity 20 comprises known elements, such as a communication part 21 for exchanging data and signals with other network entities, a processor 22 for controlling the entity and processing data and information, and a storage part 23 for holding data and software. The processor 22 can e.g. be a programmable processor. The call control entity comprises a call controller 221 for providing call control services to subscribers having circuit switched subscriptions. The call controller 221 can be provided as hardware, software, or any suitable combination of hardware. In the example of FIG. 2, controller 221 is constituted by appropriate computer code parts executed in processor 22. The call control entity furthermore comprises a subscriber association redirector 222 for redirecting an association of a subscriber associated with the call control entity and having a subscription to the set of services centred in said Internet Protocol based network 13 to the group 121 of call control entities arranged for providing a gateway to connect to the Internet Protocol based network 13. The association redirector 222 can be provided as hardware, software, or any suitable combination of hardware. In the example of FIG. 2, redirector 222 is constituted by appropriate computer code parts executed in processor 22.

Figure 3:
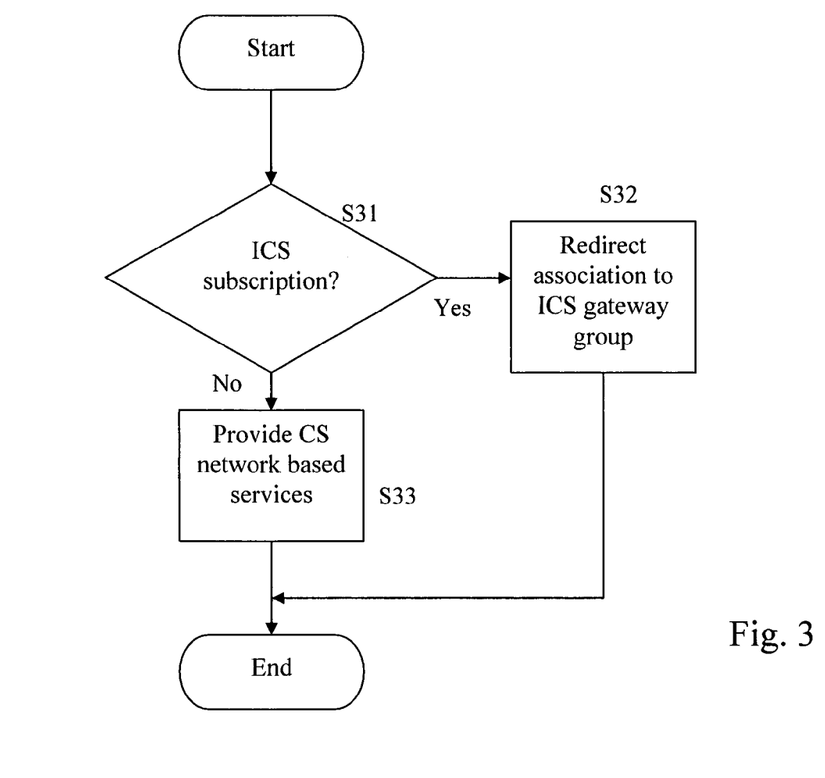
FIG. 3 shows a flow chart of a method embodiment of the present invention.

FIG. 3 shows a flow chart of a method embodiment of the present invention. A method of controlling a call control entity of a communication network as described above is shown. The method comprises controlling (S33) call control entity to provide call control services to subscribers having circuit switched subscriptions, and redirecting (S32) an association of a subscriber associated with the call control entity and having a subscription to the set of services centred in said Internet Protocol based network to a group of call control entities arranged for providing a gateway to connect to said Internet Protocol based network. For example, if the network 13 is an IMS and the services are ICS, the procedure determines in step S31 whether a subscriber associated with the entity has an ICS subscription (e.g. by checking the above mentioned marker), and if yes, redirecting the association to the second group 121, and if no, providing CS network based services.

Now further detailed examples will be described in accordance with a preferred application of the present invention, namely in the context of ICS.

Figure 4:
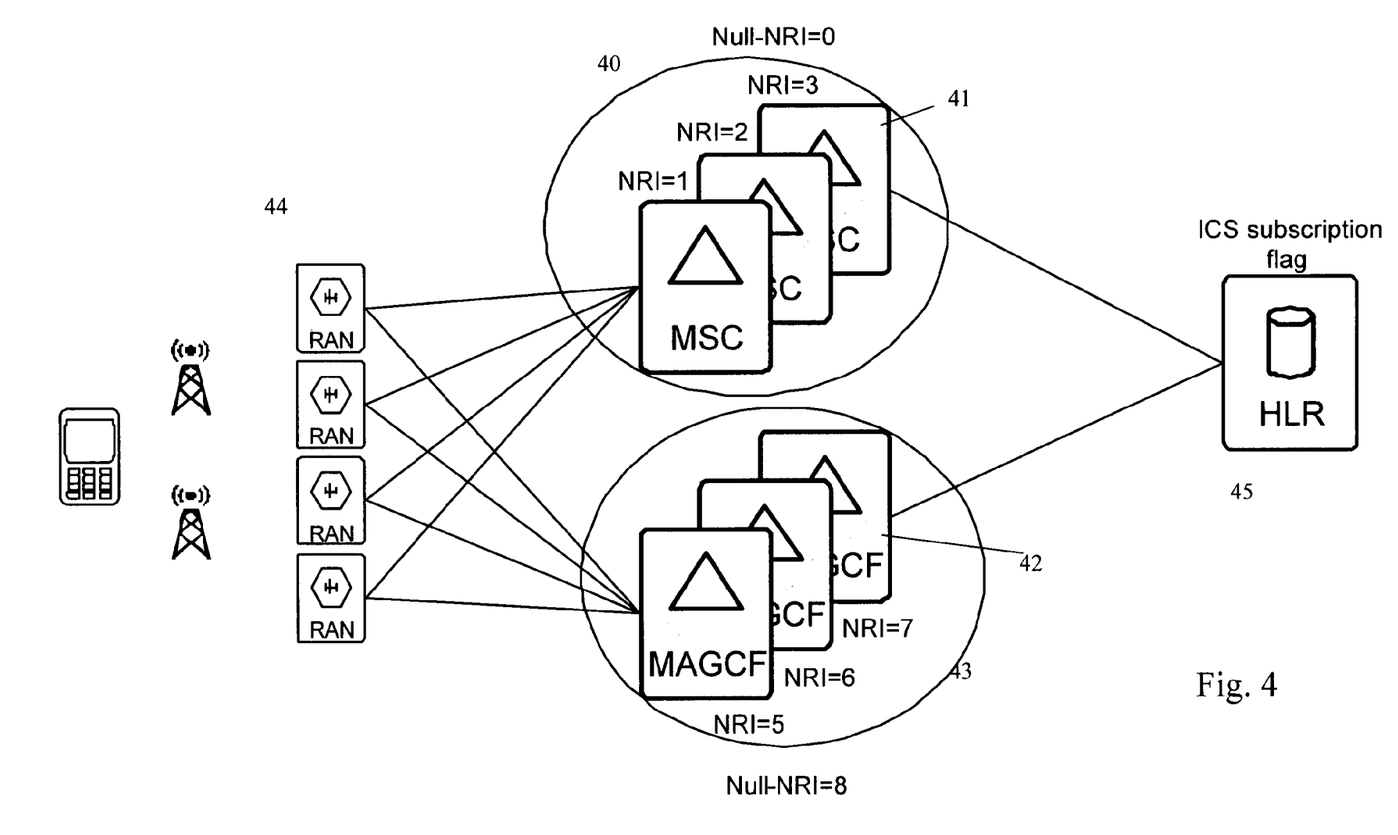
FIG. 4 shows a schematic representation of a communication system according to a further embodiment of the present invention.

The network shown in FIG. 4 comprises MSC nodes 41, supporting a set of subscriber services consisting of standardized CS services, and possibly an additional number of proprietary services. These MSC nodes 41 are not upgraded with support for ICS, i.e. are not fully enhanced. When migrating the subscribers to IMS, the standardized CS services are e.g. replaced by MMTel services. Typically, the same implementation of proprietary services in IMS is not supported.

The basic concept of the embodiment is to add ICS support to the network by adding new nodes supporting ICS. These nodes are here called MAGCF (Mobile Access Gateway Controller Function) 42 and do not need to execute any CS based services, but only to grant a subscriber access to the IMS service domain also when roaming in 2G/3G radio access areas. So before the subscriber is migrated to IMS, he is served by the MSC nodes 41 and the MSC based services. After the migration to IMS, he is served by the MAGCF nodes 42, giving him access to IMS.

To smoothen the migration, the embodiment combines MSC nodes 41 and MAGCF nodes 42 in a pool configuration. The RAN nodes 44 (BSC and/or RNC) are connected to all MSC and MAGCF nodes 41, 43. The MSC nodes 41 and MAGCF nodes 42 are combined into two sub-pools, respectively 40 and 43. MSC and MAGCF nodes have individual NRI identifier, as indicated in FIG. 4, which allows the RAN nodes 44 to route subscribers always to the same controlling node.

In one option of the invention, the sub-pool of MSC nodes and the sub-pool of MAGCF codes have different, unique Null-NRI identifiers. The starting point of the migration of CS subscribers to IMS can be to build a common pool of MSC and MAGCF nodes. However, all subscribers remain in the MSC nodes sub-pool, which are upgraded by a simple patch 51 to support this invention.

Figure 5:
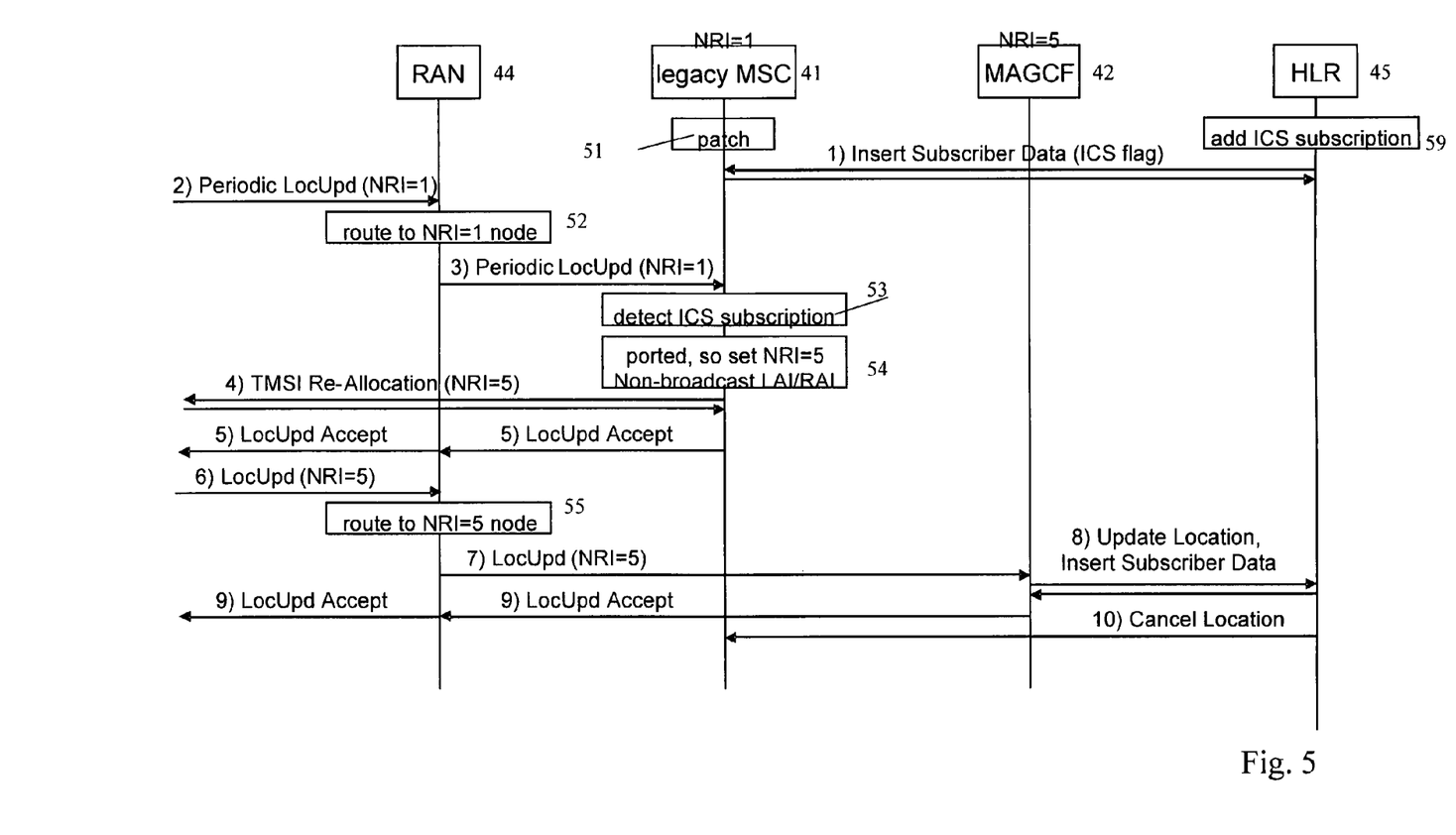
FIGS. 5-8 show signal exchange charts in accordance with embodiments of the present invention.

In a first variant shown in FIG. 5, the migration of CS subscriber to IMS is done by adding the ICS subscription to the subscriber profile in HLR 45, see 59. When the subscriber profile is updated, the HLR 45 updates the MSC node 41 where the subscriber is located (Step 1), i.e. the MSC node with which the subscriber is associated. The VLR (not shown) is updated with the changed data. When the terminal (not shown) of the migrated subscriber performs the next periodic location update (step 2), this message is routed by the RAN node 44 using the NRI value in the TMSI, in this case NRI=1 so it is routed to the MSC (52 and step 3).

The new logic in the MSC 41 detects that the subscriber now has an ICS subscription in his profile, so he is ported to IMS, see 53 and 54. In this option of the invention, the MSC 41 assigns a new NRI value to the subscriber. This NRI value points to one of the MAGCF nodes and the subscribers can be assigned to all existing MAGCF nodes in a load sharing manner. For example, the MSC has a record of all NRIs of members of pool 43, and assigns the NRIs in a round-robin fashion.

A new TMSI containing this new NRI value is returned to the terminal in step 4, in the example NRI=5. The location update is acknowledged containing a non-broadcast LAI/RAI (step 5), which causes the terminal to immediately do a new location update. This is done in step 6, and the terminal uses the new TMSI with the new NRI value, which causes the RAN node to forward this location update to the MAGCF node 42 owning this NRI (55 and step 7). The MAGCF 42 receiving this location update request registers the subscriber by informing the HLR 45, downloading the subscriber data (step 8), and acknowledging to the terminal (step 9). The HLR 45 cancels the old registration in the MSC 41 (step 10).

Using this embodiment, it is possible to migrate subscriber by subscriber (in a step wise fashion) from the MSC service domain to the IMS service domain, by just setting the ICS subscription in HLR.

Figure 6:
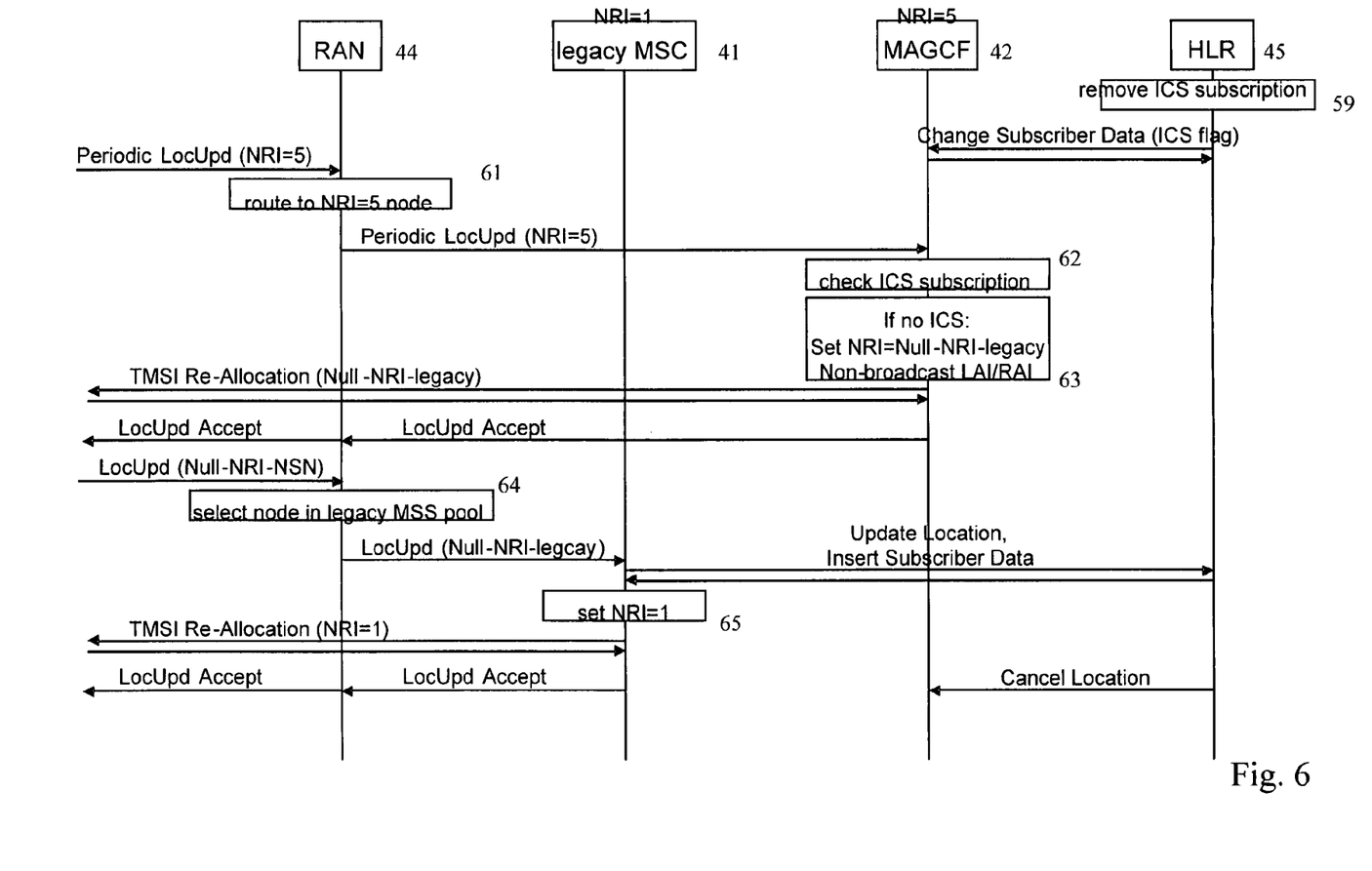

As a fallback, the same mechanism could be used to port subscribers back to MSC. This is shown in FIG. 6. By removing the ICS subscription flag in the HLR 45, the MAGCF 42 is informed and notices the change. By assigning a MSC NRI value and forcing a location update, the subscriber can be pushed back into the MSC. In other words, at 61 the RAN routes the signalling to MAGCF 42 on the basis of the association suing NRI=5, but the MAGCF then notices (62) the missing ICS subscription (flag set to ICS invalid), and then redirects (63) the association to the MSC pool. In this way, the MAGCFs do not need to be able to provide CS based services, i.e. they can be implemented to exclusively act as gateways to the IMS, because the provisioning of CS based services can be accomplished by redirection.

Figure 7:
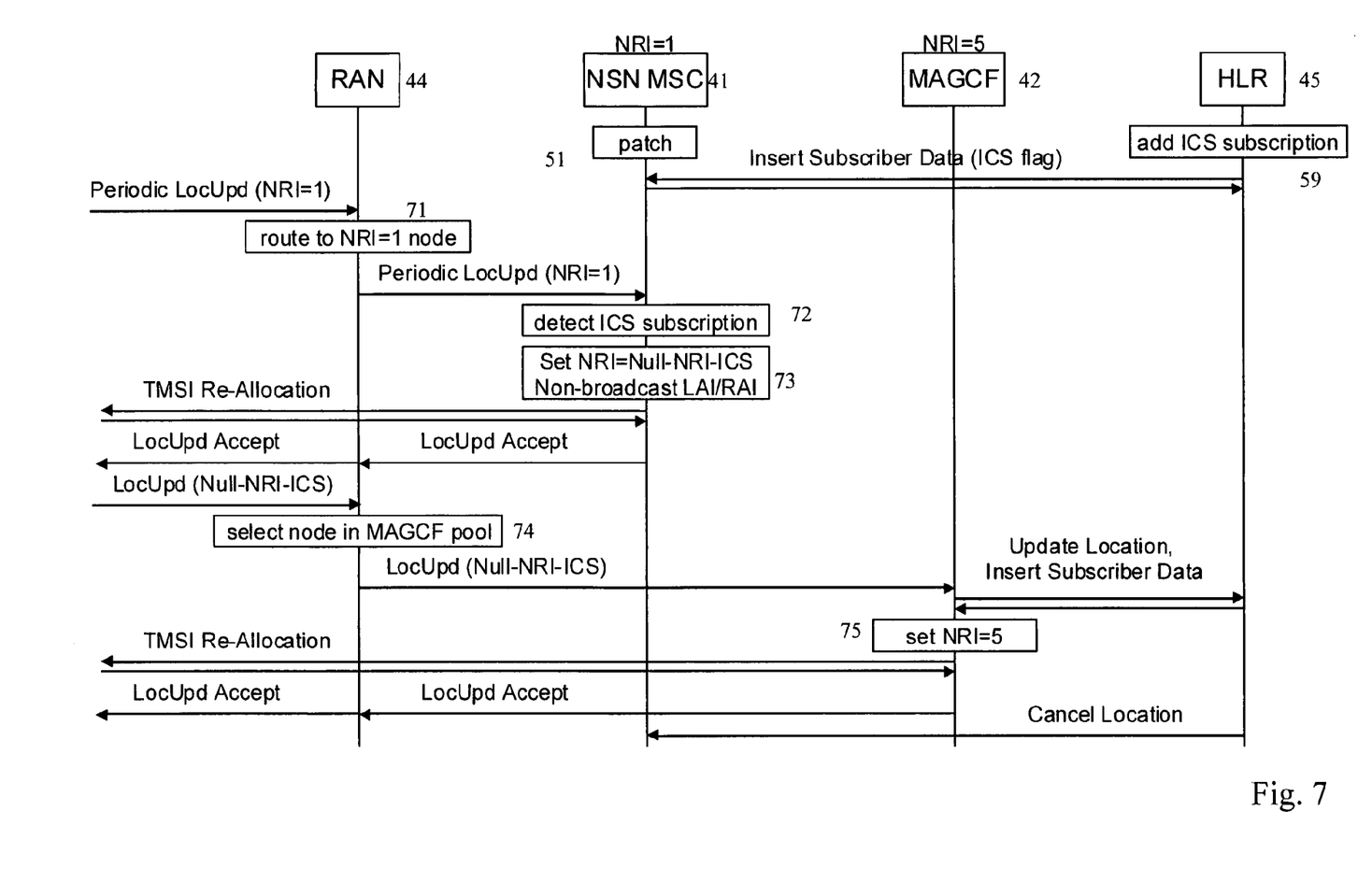

Another option is to use two unique Null-NRI values per sub-pool 40 and 43. It is known to use multiple Null-NRI values in shared network to distribute traffic between two operators. In the example of FIG. 7, the MSC 41 sets the NRI to the Null-NRI value of the MAGCF pool 43, in the example to Null-NRI=8, see 73, after having detected the ICS subscription (72). The RAN node 44 checks the NRI value to decide the routing towards the pool. A Null-NRI value means that no pool node has been selected, and the load distribution function of the RAN node, for example the Non Access Stratum (NAS) Node selection function of TS 23.236 V. 9.0.0, is used select a new pool node for the subscriber, see 74. MAGCF 42 then sets its own NRI (5 in the example, see 75) for the TMSI, in order to provide a unique association.

The handling is very similar to the example of FIG. 5, such that the same steps are not described again. The difference is that that the pool members do not need any awareness of the NRI value of the other pool members, as Null-NRIs are used which only generally refer to a pool.

Figure 8:
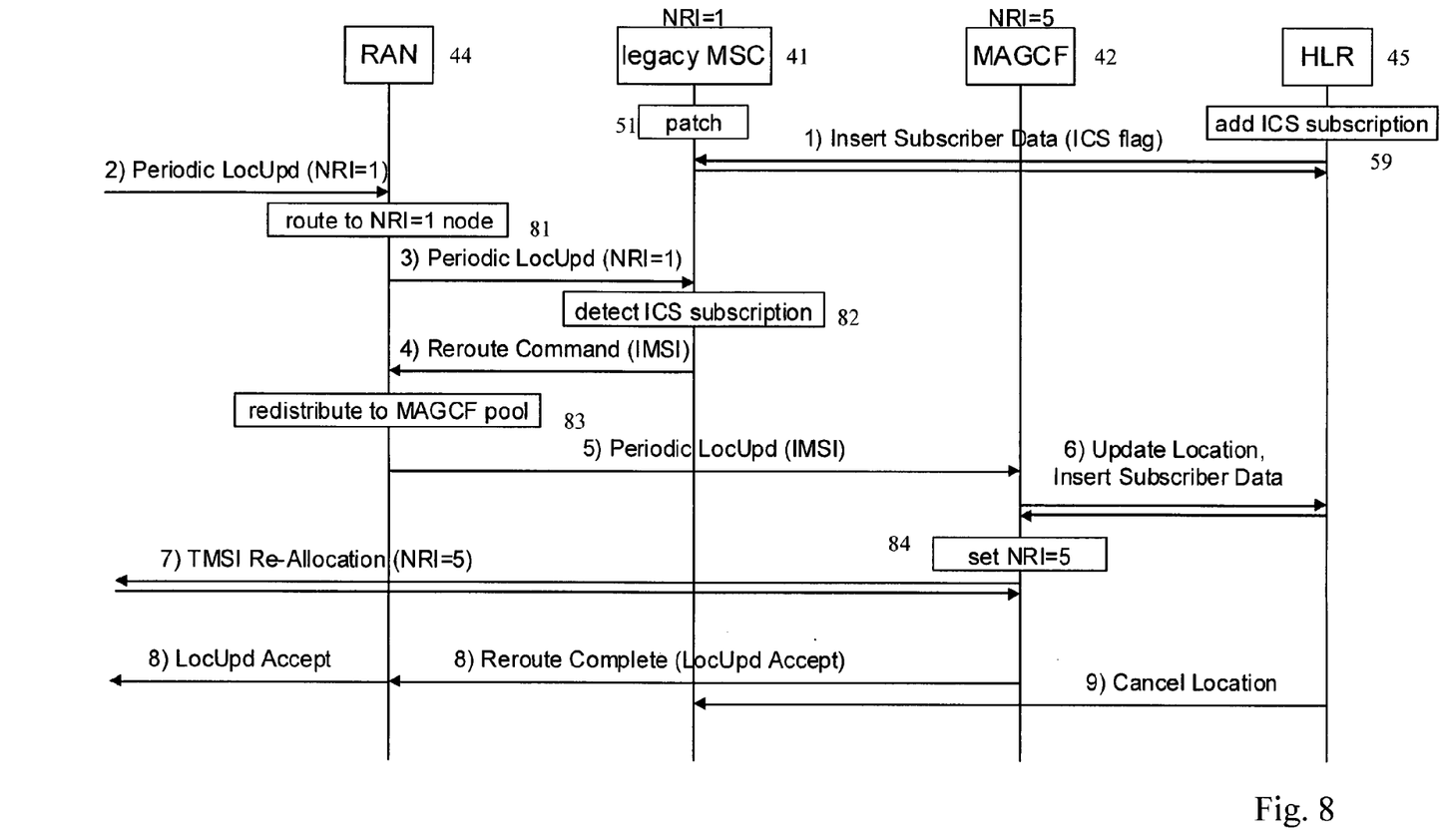

Another option is to use a reroute command, as shown in FIG. 8, e.g. the Multi-Operator Core Network (MOCN) Reroute Command from MSC to RNC to indicate in to the RNC to redirect the subscriber.

In this case the MSC 41 will check the ICS subscription (82), and if the subscriber is to be ported to IMS, the MSC 41 will at the next location update order the RAN node 44 to redirect the location update to the MAGCF 42. The migration of CS subscribers to IMS is done by adding the ICS subscription to the subscriber profile in HLR 45 (see 59). When the subscriber profile is updated, the HLR 45 updates the MSC node 41 where the subscriber is located (Step 1). The VLR is updated with the changed data. When the terminal of the migrated subscriber performs the next periodic location update (step 2), this message is routed by the RAN node using the NRI value in the TMSI (81), in this case NRI=1 so it is routed to the MSC 41 (step 3).

The new logic in the MSC 41 (i.e. patch 51) detects that the subscriber now has an ICS subscription in his profile, see 82, so he is ported to IMS. In this embodiment of the invention, the MSC 41 returns a Reroute Command to the RAN node 44 (step 4), including also the International Mobile Subscriber Identity (IMSI) of the subscriber. The Reroute Command causes the RAN node 44 to send the Location Update request to the MAGCF (83 and step 5), which now includes the IMSI. The MAGCF 42 receiving this location update request registers the subscriber by informing the HLR 45, downloading the subscriber data (step 6), and allocates a TMSI with its own NRI (84 and step 7). An acknowledgment Reroute Complete is returned to the RAN node 44 (step 8) and to the terminal. The HLR 45 cancels the old registration in the MSC 41 (step 9).

Although the invention has been described by making reference to detailed embodiments, these are not intended to be limiting and only serve to better understand the invention, which is defined by the appended claims. Reference numerals only serve to make the claims easier to read and have no limiting effect.

The invention claimed is:

1. A communication network, comprising:
   an access network;
   a switching control network comprising call control entities that form a pool of control nodes comprising a first group of control entities and a second group of control entities, the call control entities arranged for providing services to subscribers, wherein the access network is configured to route signalling of a given subscriber to a call control entity where the given subscriber is registered; and
   an Internet Protocol based network for providing a set of services centered in the Internet Protocol based network to one or more of the subscribers;
   wherein each call control entity in the first group of call control entities is configured to provide call control services to subscribers having circuit switched subscriptions, and each call control entity in the second group of call control entities is configured to provide a gateway to connect to the Internet Protocol based network for subscribers having subscriptions to the set of services centered in the Internet Protocol based network; and
   wherein each first call control entity comprises a subscriber association redirector configured to move a registration of a first subscriber, registered with each corresponding first call control entity and having a subscription to the services centered in the Internet Protocol based network, to the group of second call control entities such that the registration of the first subscriber is removed from the corresponding first call control entity.

2. The communication network of claim 1, wherein:
   the Internet Protocol based network comprises an Internet Protocol Multimedia Subsystem; and
   the services centered in the Internet Protocol based network comprise IP Multimedia Subsystem Centralized Services.

3. The communication system of claim 1, wherein the call control entities comprise at least one of Mobile Switching Centers and Mobile Switching Center servers.

4. The communication system of one of claim 1, wherein the group of first call control entities forms a first pool and the group of second call control entities forms a second pool.

5. The communication system of claim 1, wherein the subscriber association redirector is configured to detect subscriptions to the set of services centered in the Internet Protocol based network based on a subscription marker set by a subscription register entity.

6. The communication system of claim 1, wherein the subscriber association redirector is configured to move the registration of the first subscriber by assigning a new Temporary Mobile Subscriber Identity.

7. The communication system of claim 6, wherein the subscriber association redirector is configured to move the registration of the first subscriber by at least one of:
    setting a network resource identifier associated with one of the second call control entities in the Temporary Mobile Subscriber Identity; and
    setting a group identity resource identifier associated with the group of second call control entities in the Temporary Mobile Subscriber Identity.

8. The communication system of claim 1, wherein the subscriber association redirector is configured to move the registration of the first subscriber by sending a reroute command to the access network.

9. A call control entity in a communication network, the communication network comprising an access network, a switching control network comprising call control entities that form a pool of control nodes comprising a first group of control entities and a second group of control entities, the call control entities arranged to provide services to subscribers, where the access network is configured to route signalling of a given subscriber to a call control entity where the given subscriber is registered, and an Internet Protocol based network to provide a set of services centered in the Internet Protocol based network to one or more of the subscribers, the call control entity in the first group of call control entities comprising:
    a call controller circuit in the first group of call control entities configured to provide call control services to subscribers having circuit switched subscriptions; and
    a subscriber association redirector circuit configured to move a registration of a first subscriber, registered with the call control entity and having a subscription to the set of services centered in the Internet Protocol based network, to the second group of call control entities configured to provide a gateway to connect to the Internet Protocol based network such that the registration of the first subscriber is removed from the call control entity.

10. The call control entity of claim 9, wherein:
    the Internet Protocol based network comprises an Internet Protocol Multimedia Subsystem; and
    the services centered in the Internet Protocol based network comprise IP Multimedia Subsystem Centralized Services.

11. The call control entity of claim 9, wherein the call control entity comprises one of a Mobile Switching Center and a Mobile Switching Center server.

12. The call control entity of claim 9, wherein the subscriber association redirector is configured to detect subscriptions to the set of services centered in the Internet Protocol based network based on a subscription marker set by a subscription register entity.

13. The call control entity of claim 9, wherein the subscriber association redirector is configured to move the registration of the first subscriber by assigning a new Temporary Mobile Subscriber Identity.

14. The call control entity of claim 13, wherein the subscriber association redirector is configured to move the registration of the first subscriber by at least one of:
    setting a network resource identifier associated with one of the second call control entities in the Temporary Mobile Subscriber Identity; and
    setting a group identity resource identifier associated with the group of second call control entities in the Temporary Mobile Subscriber Identity.

15. The call control entity of claim 9, wherein the subscriber association redirector is configured to move the registration of the first subscriber by sending a reroute command to the access network.

16. A method of controlling a call control entity of a communication network, the communication network comprising an access network, a switching control network comprising call control entities that form a pool of control nodes comprising a first group of control entities and a second group of control entities, the call control entities arranged to provide services to subscribers, where the access network is configured to route signalling of a given subscriber to a call control entity where the given subscriber is registered, and an Internet Protocol based network for providing a set of services centered in the Internet Protocol based network to one or more of the subscribers, the method comprising:
    controlling, by a processor, the call control entity in the first group of call control entities to provide call control services to subscribers having circuit switched subscriptions; and
    moving, by the same processor or a further processor, a registration of a first subscriber, registered with the call control entity and having a subscription to the set of services centered in the Internet Protocol based network, to the second group of call control entities configured to provide a gateway to connect to the Internet Protocol based network such that the registration of the first subscriber is removed from the call control entity.

17. The method of claim 16, wherein:
    the Internet Protocol based network comprises an Internet Protocol Multimedia Subsystem; and
    the services centered in the Internet Protocol based network comprise IP Multimedia Subsystem Centralized Services.

18. The method of claim 16, wherein the call control entity comprises one of a Mobile Switching Center and a Mobile Switching Center server.

19. The method of one of claim 16, wherein moving the registration of the first subscriber comprises detecting subscriptions to the set of services centered in the Internet Protocol based network based on a subscription marker set by a subscription register entity.

20. The method of claim 16, wherein moving the registration of the first subscriber comprises assigning a new Temporary Mobile Subscriber Identity.

21. The method of claim 20, wherein moving the registration of the first subscriber comprises at least one of:
    setting a network resource identifier associated with one of the second call control entities in the Temporary Mobile Subscriber Identity; and
    setting a group identity resource identifier associated with the group of second call control entities in the Temporary Mobile Subscriber Identity.

22. The method of one of claim 16, wherein moving the registration of the first subscriber comprises sending a reroute command to the access network.

\* \* \* \* \*